(12) United States Patent
Doria et al.

(10) Patent No.: US 12,359,996 B2
(45) Date of Patent: Jul. 15, 2025

(54) HYDRAULIC PRESSURE TRANSMISSION DEVICE, AND PRESSURE SENSOR HAVING A HYDRAULIC PRESSURE TRANSMISSION DEVICE

(71) Applicant: Endress+Hauser SE+Co. KG, Maulburg (DE)

(72) Inventors: Patrick Doria, Berlin (DE); Dennis Müller, Groß Kreutz OT (DE)

(73) Assignee: Endress+Hauser SE+Co. KG, Maulburg (DE)

(*) Notice: Subject to any disclaimer, the term of this patent is extended or adjusted under 35 U.S.C. 154(b) by 276 days.

(21) Appl. No.: 18/042,938

(22) PCT Filed: Jul. 22, 2021

(86) PCT No.: PCT/EP2021/070512
§ 371 (c)(1),
(2) Date: Feb. 24, 2023

(87) PCT Pub. No.: WO2022/042959
PCT Pub. Date: Mar. 3, 2022

(65) Prior Publication Data
US 2023/0314252 A1     Oct. 5, 2023

(30) Foreign Application Priority Data

Aug. 25, 2020    (DE) .................... 10 2020 122 193.2

(51) Int. Cl.
*G01L 19/06*    (2006.01)
*G01L 19/00*    (2006.01)
(52) U.S. Cl.
CPC ...... *G01L 19/0645* (2013.01); *G01L 19/0092* (2013.01)

(58) Field of Classification Search
None
See application file for complete search history.

(56) References Cited

U.S. PATENT DOCUMENTS 11,668,617 B2 * 6/2023 Doria ................. G01L 19/0645
                                                                73/706

FOREIGN PATENT DOCUMENTS

CN    101263374 A    9/2008
CN    101665027 A    3/2010
(Continued)

*Primary Examiner* — Peter J Macchiarolo
*Assistant Examiner* — Jermaine L Jenkins
(74) *Attorney, Agent, or Firm* — Kelly J. Smith; Endress+Hauser (USA) Holding, Inc.

(57) ABSTRACT

A pressure transmission device includes a main part and a separating membrane secured to the main part. A pressure chamber is formed between the separating membrane and a surface, with the pressure chamber communicating with a hydraulic path. The separating membrane is: supplied with the process medium from a first membrane side; the pressure chamber and the hydraulic path are filled with a transmission fluid; the separating membrane is connected to the main part; and the separating membrane has a central region. The device additionally comprises a temperature sensor and a mount, wherein the temperature sensor introduced into the mount. The mount is arranged in a central cavity in such a way that a surface of the mount facing the separating membrane lies on a plane relative to the central region such that the surface of the mount acts as an abutment for the separating membrane when pressure is applied.

15 Claims, 4 Drawing Sheets

(56) References Cited

FOREIGN PATENT DOCUMENTS

| | | |
|---|---|---|
| CN | 107771274 A | 3/2018 |
| DE | 10319417 A1 | 11/2004 |
| DE | 102004052950 A1 | 5/2006 |
| DE | 102018123433 A1 | 3/2020 |
| WO | 2007012571 A1 | 2/2007 |

* cited by examiner

HYDRAULIC PRESSURE TRANSMISSION DEVICE, AND PRESSURE SENSOR HAVING A HYDRAULIC PRESSURE TRANSMISSION DEVICE

CROSS-REFERENCE TO RELATED APPLICATIONS

The present application is related to and claims the priority benefit of DPMA Patent Application No. 10 2020 122 193.2, filed on Aug. 25, 2020, and International Patent Application No. PCT/EP2021/070512, filed on Jul. 22, 2021, the entire contents of which are incorporated herein by reference.

TECHNICAL FIELD

The present invention relates to a hydraulic pressure transmission device and a pressure sensor having a hydraulic pressure transmission device.

BACKGROUND

Hydraulic pressure transmission devices usually comprise a main body that has a surface to which a separating membrane with at least two weld seams is fastened in a pressure-tight manner, such that a pressure chamber is formed between the separating membrane and the surface and communicates with a hydraulic path via an opening in the surface of the main body. The pressure chamber and the hydraulic path are filled with a transmitting fluid.

Knowledge of the process temperature is generally essential for controlling an industrial process. When hydraulic pressure transmission devices are used, the process temperature is usually detected by two different possibilities. With the first possibility, a resistance change of a resistor in the pressure sensor is used to determine the process temperature, whereas with the second possibility, a temperature sensor formed separately from the pressure sensor is used to determine the process temperature.

Insofar as temperature-dependent deformations of the separating membranes are accompanied by a separating membrane error during the pressure measurement, it is likewise of fundamental interest for precise pressure measurements to know the temperature of the pressure transmission device in the region of the pressure chamber or of the separating membrane and thus of the process as precisely as possible. The solutions known from the prior art have a temperature sensor which is arranged either next to the separating membrane or is inserted from the rear into the main body of the pressure transmission device in order to measure the temperature of the main body in the vicinity of the pressure chamber. These sensor positions are in principle erroneous because the thermal mass of the main body prevents an immediate adaptation of the main body temperature to the temperature of the transmitting fluid in the pressure chamber, which can change very quickly with rapid changes in the medium temperature and convective heat transport through a flowing medium.

In contrast, a temperature sensor which is arranged next to the separating membrane and which optionally is in contact with the medium requires either an additional opening in the media container or in the media-carrying line, through which the temperature sensor can be inserted, or with a given separating membrane surface, the radius of the main body must be enlarged by such a value that space is still present on the edge of the main body for mounting a temperature sensor next to the separating membrane.

However, all of the aforementioned possibilities have the disadvantage that an approximately real-time temperature recording is not possible.

SUMMARY

It is therefore the object of the present invention to provide a pressure transmission device and a pressure sensor with a pressure transmission device that provides the possibility of approximately real-time temperature measurement.

The object is achieved by the pressure transmission device and the pressure sensor according to the present disclosure.

The pressure transmission device according to the invention for transmitting a pressure of a process medium comprises:
a main body having a surface;
and a separating membrane fastened to the surface, wherein a pressure chamber is formed between the separating membrane and the surface, which pressure chamber communicates with a hydraulic path via an opening in the surface, the separating membrane can be pressurized with the process medium from a first separating membrane side, the pressure chamber and the hydraulic path are filled with a transmitting fluid in order to transmit the pressure of the process medium; the separating membrane is a plate-shaped membrane with a circumferential edge and the plate-shaped membrane is connected in a pressure-tight manner to the surface of the main body via one,
preferably a single, circumferential weld seam, and the separating membrane has a central middle region, wherein the pressure transmission device further comprises a temperature sensor for determining a temperature measurement variable of the process medium and a mount for the temperature sensor for improved heat transfer between the process medium and the temperature sensor, wherein the temperature sensor is at least partially inserted into or attached to the mount, wherein the mount is inserted into and arranged in a central recess in the main body behind the middle region of the separating membrane such that a surface of the mount facing the separating membrane lies in a plane relative to the separating membrane in the middle region, such that the surface of the mount serves as a stop surface for the separating membrane when pressure is applied.

According to the invention, the insertion of a thermally conductive temperature sensor mount, for example made of copper or a similar material, into the main body behind the process membrane is proposed. The temperature sensor is attached to or at least partially inserted into the mount. This can also be done supportingly by means of a thermally conductive adhesive. The mount is designed in such a manner that the process membrane also has a stop surface on the mount against which it can be supported or rest, such that undesirable embossing of the separating membrane, for example due to high pressure on the process side, is prevented.

An advantageous embodiment of the pressure transmission device according to the invention provides that the central recess and the mount are matched to one another in such a manner that a contact surface with which the mount is in direct contact with the main body is smaller than the surface of the mount lying in a plane relative to the separating membrane in the middle region.

A further advantageous embodiment of the pressure transmission device according to the invention provides that the mount is formed from a material with a thermal conductivity of greater than 200 W/(m*K), preferably greater than 300 W/(m*K), most preferably greater than 400 W/(m*K).

A further advantageous embodiment of the pressure transmission device according to the invention provides that the mount is formed from copper.

A further advantageous embodiment of the pressure transmission device according to the invention provides that the mount is fixed to the separating membrane with the surface facing the separating membrane, preferably by means of a thermally conductive adhesive layer.

A further advantageous embodiment of the pressure transmission device according to the invention provides that the mount comprises a preferably rotationally symmetrical plate-shaped base and a preferably rotationally symmetrical cylindrical part adjoining the base and having a recess for receiving the temperature sensor, wherein the mount is inserted into and arranged in the main body in such a manner that the plate-shaped base is oriented in the direction of the separating membrane.

A further advantageous embodiment of the pressure transmission device according to the invention provides that the mount is further formed such that the diameter of the plate-shaped base is larger than the diameter of the cylindrical part, such that a protrusion is formed, which serves as a stop surface for the mount, and wherein the main body is further formed such that the central recess on the side facing the separating membrane has a step-shaped opening that is formed such that a tread surface of the step-shaped opening serves as a counter stop surface for the stop surface of the mount.

A further advantageous embodiment of the pressure transmission device according to the invention provides that the mount further comprises a vent opening, which is made in the mount in such a manner that air that is between the separating membrane and the surface of the mount serving as a stop surface can escape, preferably through the central recess.

A further advantageous embodiment of the pressure transmission device according to the invention provides that the main body and the separating membrane each comprise a metallic material.

A further advantageous embodiment of the pressure transmission device according to the invention provides that the mount is connected on the separating membrane with the surface facing the separating membrane by means of a thermally conductive bonding layer, preferably a thermally conductive adhesive layer, a soft solder bonding layer or a thermally conductive paste layer.

A further advantageous embodiment of the pressure transmission device according to the invention provides that the central recess is realized by a plurality of bores with different diameters and preferably extends through the entire main body.

A further advantageous embodiment of the pressure transmission device according to the invention provides that an intermediate space between the mount and a wall of the central recess is at least partially filled with a thermal insulation material, preferably a thermal insulation material other than air.

The invention further relates to a pressure sensor comprising:

a pressure transmission device according to one of the previously described embodiments and a pressure measuring cell to which the pressure of the process medium can be applied via the hydraulic path of the pressure transmission device, as well as an electronic circuit for generating a conditioned pressure-dependent signal from a primary signal of the pressure measuring cell.

In an advantageous embodiment of the pressure sensor, it is provided that the electronic circuit comprises means for processing the signals of the temperature sensor for the temperature measurement variable.

In a further advantageous embodiment of the pressure sensor, it is provided that a signal from the temperature sensor is applied to the input of a correction circuit for correcting a temperature error of the pressure-dependent signal.

BRIEF DESCRIPTION OF THE DRAWINGS

The invention is explained in more detail on the basis of the following drawings. The following are shown.

DETAILED DESCRIPTION

Figure 1:
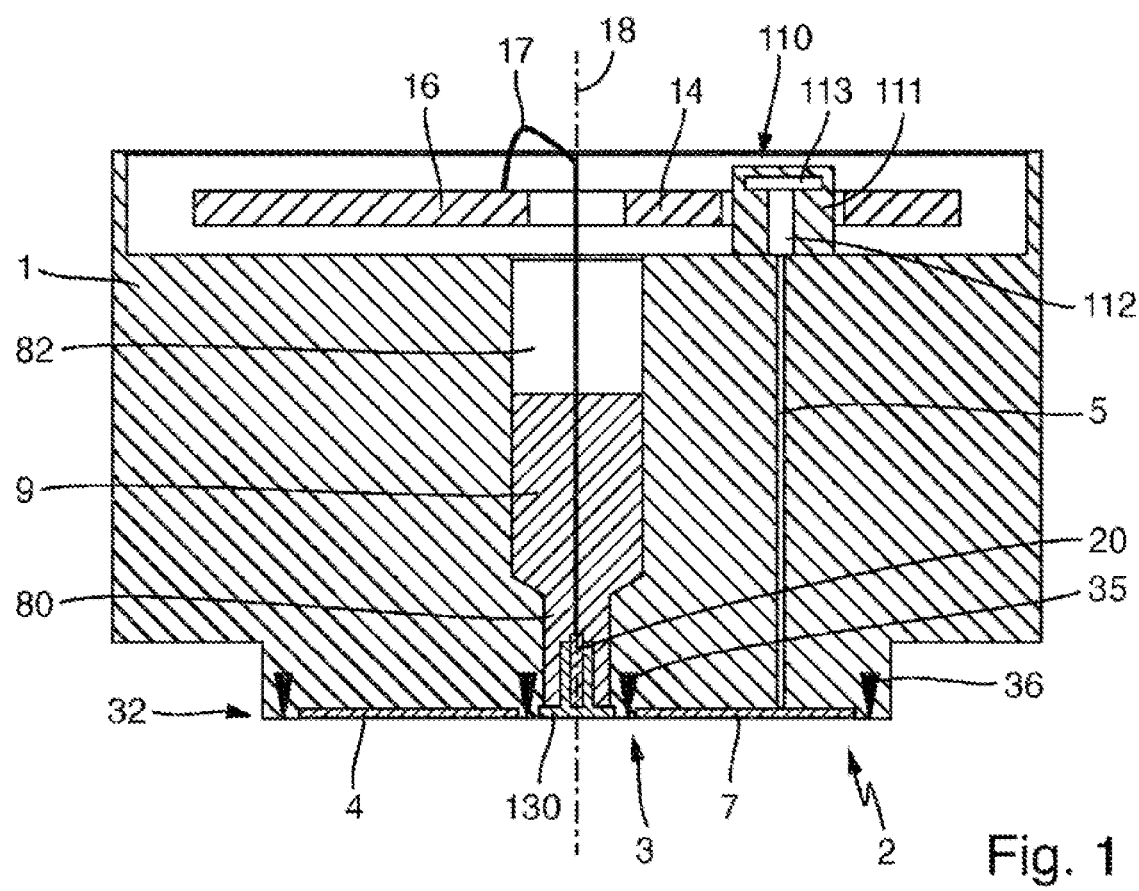
FIG. 1 shows a longitudinal section through the pressure sensor according to the present disclosure.

The pressure sensor shown in FIG. 1 comprises a main body 1, preferably metallic, in particular comprising stainless steel, with a surface 2 to which a disk-shaped separating membrane 3 is fastened with a single circumferential outer weld seam 36 at its circumferential outer edge 32, whereby a pressure chamber 4 is formed between the main body and the separating membrane 3. The separating membrane 3 of this embodiment is shown by way of example as a flat disk. The separating membrane can just as well also have a wave-shaped profile, i.e. it can have circumferential beads. From the pressure chamber 4, a bore extends through the main body 1 to form a hydraulic path and transmit the pressure to a pressure receiver. In order that the pressure can also be correspondingly transmitted, the pressure chamber is filled with a transmitting fluid 7, e.g., an oil.

In other words, the components described so far relate to a pressure transmission device module which is combined with a pressure measuring cell in order to form the pressure sensor according to the invention. For example, the pressure measuring cell 110 can comprise a carrier body 111 to which a piezoresistive pressure measuring element 113 is fastened. The pressure measuring element 113 is preferably formed as a measuring membrane that deflects under the effect of a pressure difference. The pressure measuring cell 110 can be formed as a relative pressure measuring cell, a differential pressure measuring cell or an absolute pressure measuring cell. In the embodiment shown in FIG. 1, the pressure measuring cell is formed as a relative pressure measuring cell. In this case, the pressure to be measured is applied to the pressure measuring cell via a channel 112 integrated in the carrier body 111. In this respect, the pressure measuring cell 11 serves as a pressure receiver of the hydraulic path realized by the channel 112 and a bore 5 connecting the channel 112 to the pressure chamber 4.

The primary signal from the pressure measuring cell 110 is initially pre-processed by circuitry on a circuit board 14 before being further processed and prepared for communication via common protocols, such as, for example, 4-20 mA or digital fieldbus protocols.

The pressure sensor according to the invention further comprises a temperature sensor 20, which is inserted in a central recess 80, 82 through the main body 1 of the pressure transmission device module to the rear side 34, i.e. the side of the separating membrane facing away from the process, in order to detect the temperature of the process medium. A central recess here means a recess that extends along an axis of rotation with respect to an outer contour of the main body. The central recess can be realized, for example, by one or more bores. In the exemplary embodiment shown in FIGS. 1 and 2, the central recess is realized by a plurality of bores along the central axis of the main body.

The primary signal of the temperature sensor 20, for example a PT1,000 sensor, is fed to the circuit board 14 via electrical lines 17 in order to be processed as a measurement signal and, if necessary, used to compensate for the primary signal of the pressure sensor.

The fact that the temperature sensor 20 is inserted through the main body 1 of the pressure transmission device module as far as the rear side and is therefore not in direct contact with the process medium means that contamination of the medium by the temperature sensor 20, corrosion of the temperature sensor and interaction between the medium and the temperature sensor 20 may be ruled out. Such a structure is particularly suitable for hygienic applications and/or with aggressive chemicals.

In order to be able to reliably detect rapid temperature changes of the process medium, the temperature sensor 20 is, according to the invention, inserted on the rear side of the separating membrane 3 via a mount 130, which at least partially receives or encloses the temperature sensor 20. The mount 130 is made of a particularly good thermally conductive material. For example, the mount 130 can be formed from a material with a thermal conductivity greater than 200 [W/(m*K)], preferably greater than 300 [W/(m*K)], most preferably greater than 400 [W/(m*K)]. Copper has been found to be a particularly preferred material for the mount 130 because of its good thermal conductivity.

To achieve even better heat transfer, the mount 130 can be connected to the rear side of the separating membrane 34 with the surface 133 facing the separating membrane via a thermally conductive bonding layer 15.

The mount 130 can be rotationally symmetrical. For example, the mount 130 can comprise a substantially rotationally symmetrical plate-shaped base 131 and a cylindrical part 132. The cylindrical part 132 preferably adjoins the plate-shaped base 131 centrally. In other words, the mount can have a substantially T-shaped outer contour in cross-section.

The cylindrical part of the mount 132 has a recess 136 for receiving the temperature sensor. The recess 136 extends from the end of the mount opposite the plate-shaped base to a defined depth T. For example, the recess 136 can extend to the plate-shaped base. The recess 136 can be realized by a bore, for example. The temperature sensor 20 can be fixed in the recess by means of a thermally conductive adhesive.

Figure 3:
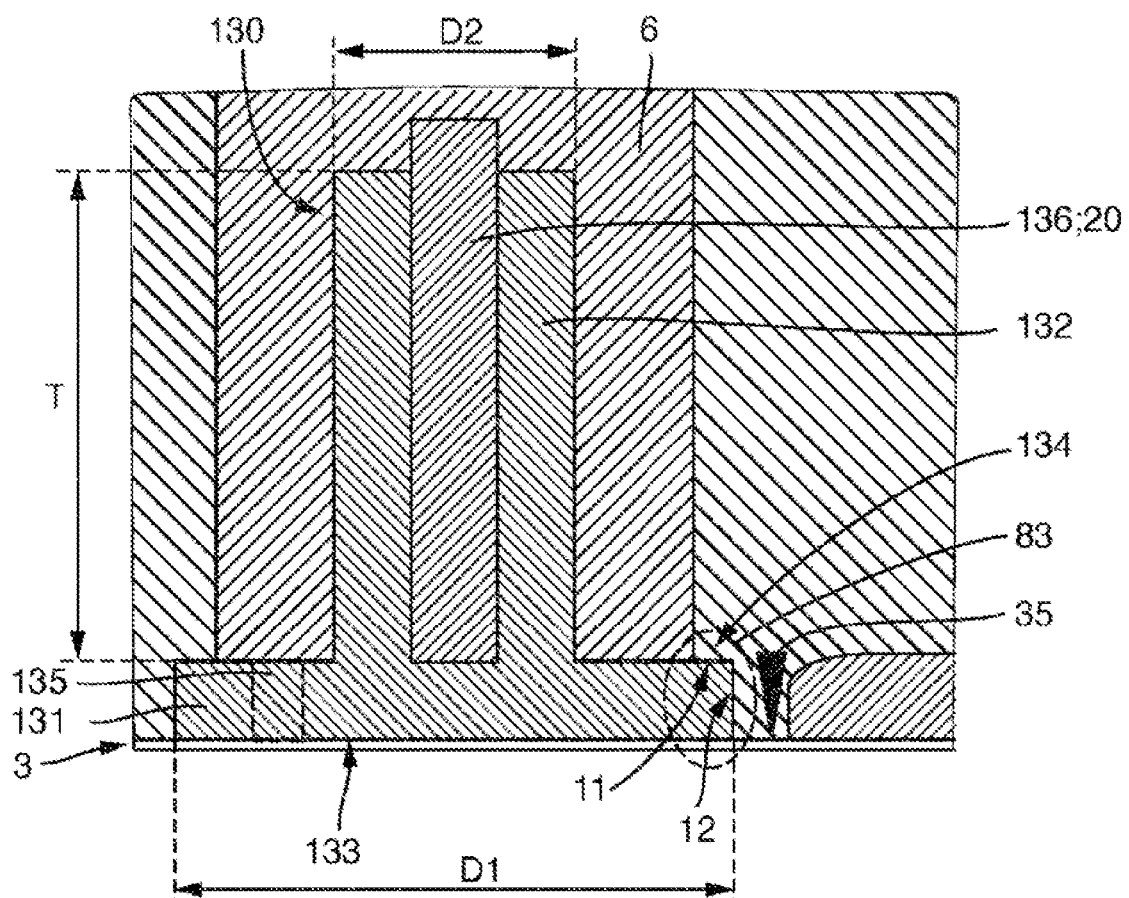
FIG. 3 shows a detail illustration of the mount.

The mount 130 is further formed such that the diameter of the plate-shaped base D1 is larger than the diameter of the cylindrical part D2. The protrusion of the plate-shaped base 131 can define a stop surface 134, with which the mount 130 can be inserted into the main body up to a counter stop surface 11 formed in the main body. The counter stop surface 11 can be realized, for example, by a step-shaped opening 83 of the central recess, on the side facing the separating membrane, wherein a tread surface serves as the counter stop surface. In FIG. 3, the step-shaped opening is indicated by a circle.

The central recess 80, 82 and the mount 130 are further matched to one another such that a contact surface with which the mount is in direct contact with the main body is smaller than the surface of the mount that is in a plane relative to the separating membrane in the middle region. In the exemplary embodiment shown in the figures, the contact surface thus comprises the counter stop surface 11 along with the side surface 12 of the step-shaped opening extending perpendicularly thereto.

Supplementally, the mount 130 can have a vent opening 135, for example in the form of a bore. The vent opening 135 is made in the mount 130 in such a manner that air can escape through the vent opening 135 from an air gap arising between the separating membrane and the plate-shaped base during the filling process of the pressure transmission device, which usually takes place in a vacuum.

Figure 2:
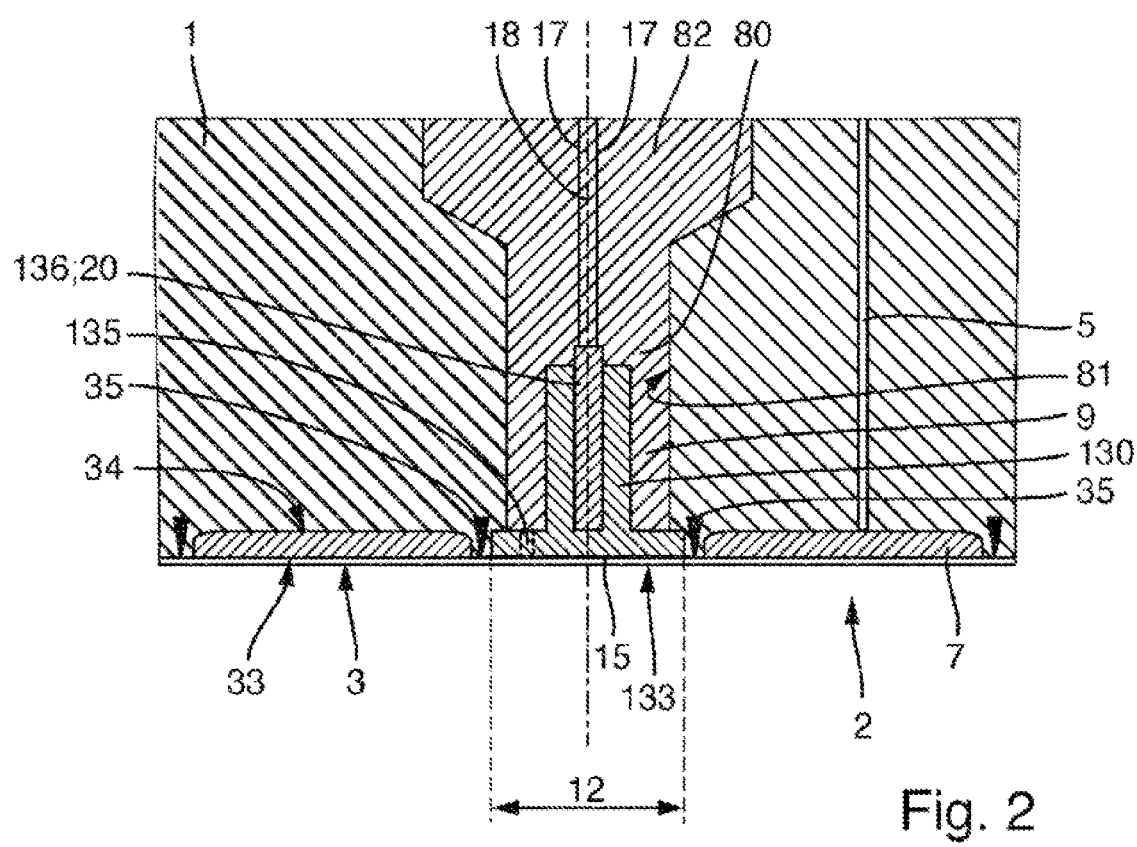
FIG. 2 shows a detail of a longitudinal section through the pressure transmission device according to the present disclosure, which is part of the pressure sensor.

The separating membrane 3 preferably has a very small thickness in the range of approximately 20-60 μm, such that approximately real-time variations in the temperature of the process medium can be detected by the temperature sensor 20. In order to thermally decouple the temperature sensor 20 from the transmitting fluid, the separating membrane 3 is joined to the main body around a middle region 12. This can be done, for example, by means of a circumferential weld seam. In FIGS. 1 and 2, the circumferential weld seam is indicated by two triangles and the reference sign 35. Alternatively, the circumferential joint can also be made by a circumferential adhesive connection 13.

To thermally decouple the temperature sensor 20 from the main body 1, a thermal insulation material 9 is located in an intermediate space between the wall of the central recess 81 and the temperature sensor 20. In this case, the thermal insulation material can be air. Alternatively, a heat-insulating gel can be incorporated. The heat-insulating gel can be a silicone gel, for example, SilGel 612 from Wacker Chemie AG.

Figure 4:
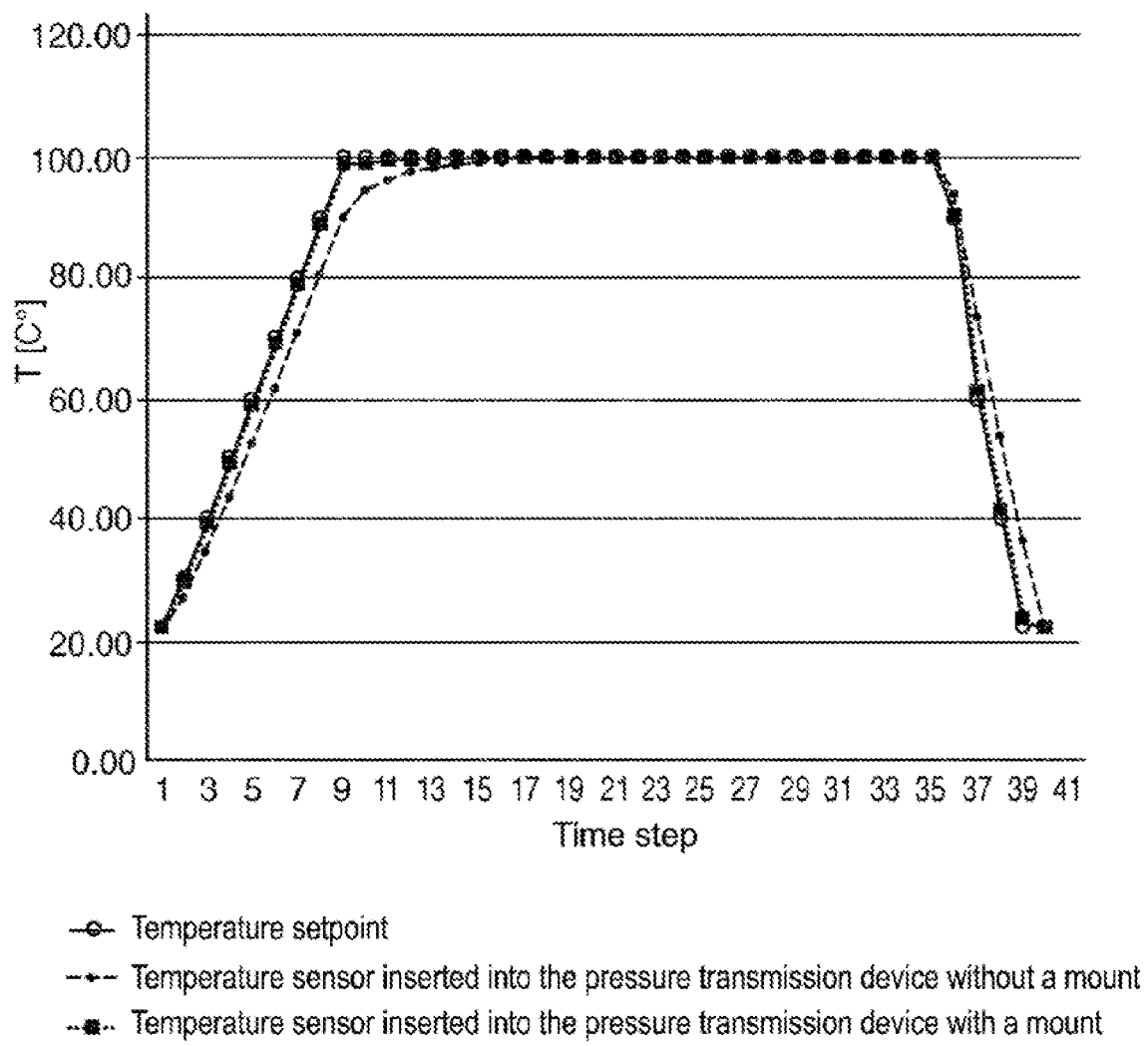
FIG. 4 shows data obtained by simulation to illustrate the effect of the mount on heat transfer.

FIG. 4 shows data obtained by simulation to illustrate the effect of the mount on the heat conduction between the process medium and the temperature sensor. For this purpose, the temperature curve of the temperature sensor of a pressure transmission device formed according to the invention with the temperature curve of a temperature sensor of a pressure transmission device with which the temperature sensor is fixed to the separating membrane without a mount. FIG. 4 shows that the temperature sensor inserted into the pressure transmission device with the mount (indicated in the measurement curve by the line with filled rectangles) reaches the temperature setpoint (indicated in the measurement curve by the line with unfilled circles) more rapidly than a temperature sensor inserted into the pressure transmission device without a mount (indicated in the measurement curve by the line with filled circles).

The invention claimed is:

1. A pressure transmission device for transmitting the pressure of a process medium, comprising: a main body which has a surface; a separating membrane fastened to the surface; a pressure chamber formed between the separating membrane and the surface, which pressure chamber communicates with a hydraulic path via an opening in the surface; wherein the separating membrane is pressurized with the process medium from a first separating membrane side; wherein the pressure chamber and the hydraulic path are filled with a transmitting fluid in order to transmit the pressure of the process medium; wherein the separating membrane is a plate-shaped membrane with a circumferential edge, and the plate-shaped membrane is connected in a pressure-tight manner to the surface of the main body via one circumferential weld seam, and the separating membrane has a central middle region; wherein the pressure transmission device further comprises a temperature sensor for determining a temperature measurement variable of the process medium and a mount for the temperature sensor for improved heat transfer between the process medium and the temperature sensor; wherein the temperature sensor is at least partially inserted into or attached to the mount, wherein the mount is inserted into and arranged in a central recess in the main body behind the middle region of the separating membrane such that a surface of the mount facing the separating membrane lies in a plane relative to the separating membrane in the middle region, such that the surface of the mount serves as a stop surface for the separating membrane when pressure is applied.

2. The pressure transmission device according to claim 1, wherein the central recess and the mount are matched to one another in such a manner that a contact surface with which the mount is in direct contact with the main body is smaller than the surface of the mount lying in a plane relative to the separating membrane in the middle region.

3. The pressure transmission device according to claim 1, wherein the mount is formed from a material having a thermal conductivity greater than 200 W/(m*K).

4. The pressure transmission device according to claim 1, wherein the mount is formed from copper.

5. The pressure transmission device according to claim 1, wherein the mount is fixed to the separating membrane with the surface facing the separating membrane, preferably by means of a thermally conductive adhesive layer.

6. The pressure transmission device according to claim 1, wherein the mount comprises a rotationally symmetrical plate-shaped base and a rotationally symmetrical cylindrical part adjoining the base and having a recess for receiving the temperature sensor, wherein the mount is inserted into and arranged in the main body in such a manner that the plate-shaped base is oriented in the direction of the separating membrane.

7. The pressure transmission device according to claim 1, wherein the mount is further formed such that the diameter of the plate-shaped base is larger than the diameter of the cylindrical part, such that a protrusion is formed, which serves as a stop surface for the mount, and wherein the main body is further formed such that the central recess on the side facing the separating membrane has a step-shaped opening that is formed such that a tread surface of the step-shaped opening serves as a counter stop surface for the stop surface of the mount.

8. The pressure transmission device according to claim 1, wherein the mount further comprises a vent opening, which is made in the mount in such a manner that air that is between the separating membrane and the surface of the mount serving as a stop surface can escape through the central recess.

9. The pressure transmission device according to claim 1, wherein the main body and the separating membrane each comprise a metallic material.

10. The pressure transmission device according to claim 1, wherein the mount is connected on the separating membrane with the surface facing the separating membrane using a thermally conductive bonding layer, a soft solder bonding layer or a thermally conductive paste layer.

11. The pressure transmission device according to claim 1, wherein the central recess is realized by a plurality of bores with different diameters and extends through the entire main body.

12. The pressure transmission device according to claim 1, wherein an intermediate space between the mount and a wall of the central recess is at least partially filled with a thermal insulation material.

13. A pressure sensor comprising: a pressure transmission device according to claim 1; a pressure measuring cell to which the pressure of the process medium is applied via the hydraulic path of the pressure transmission device, as well as an electronic circuit for generating a conditioned pressure-dependent signal from a primary signal of the pressure measuring cell.

14. The pressure sensor according to claim 13, wherein the electronic circuit is configured to process the signals of the temperature sensor for the temperature measurement variable.

15. The pressure sensor according to claim 13, wherein a signal of the temperature sensor is applied to the input of a correction circuit for correcting a temperature error of the pressure-dependent signal.

* * * * *